G. L. JONASON.
AURICULAR APPARATUS.
APPLICATION FILED FEB. 28, 1920.
1,436,264.
Patented Nov. 21, 1922.
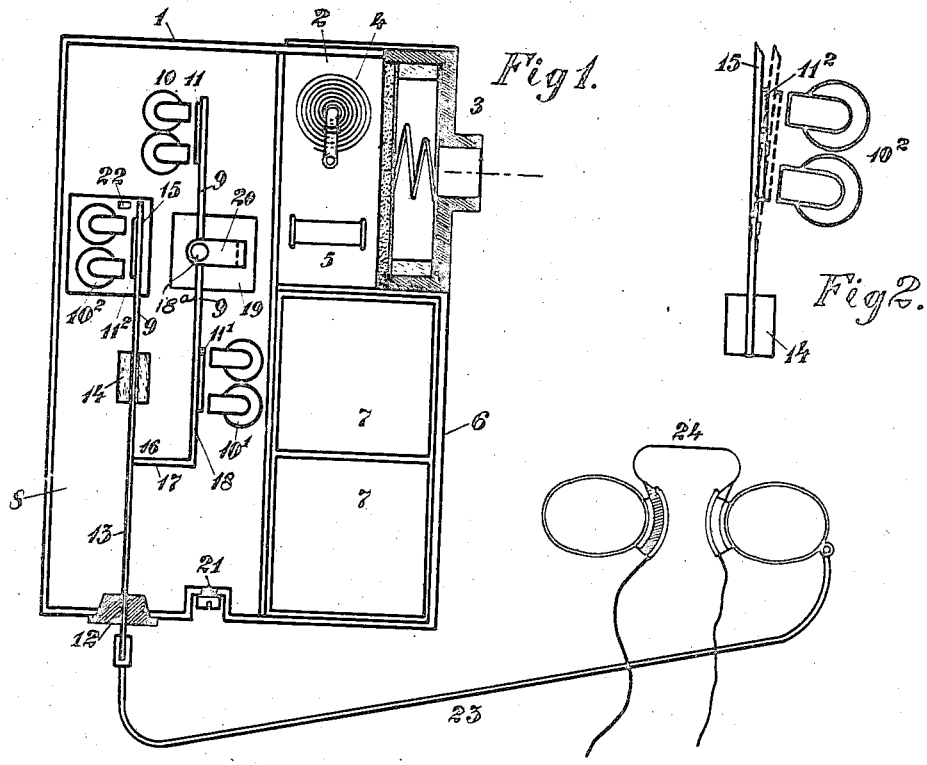
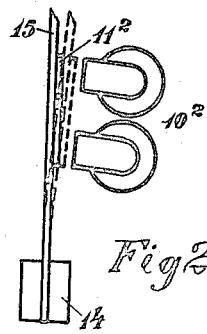
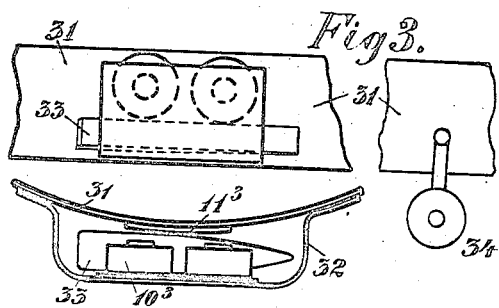
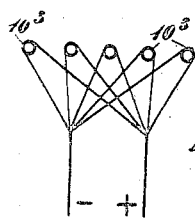
INVENTOR:
Gustaf Leonard Jonason
By Wm Wallace White
ATT'Y.

Patented Nov. 21, 1922.

1,436,264

UNITED STATES PATENT OFFICE.

GUSTAF LEONARD JONASON, OF STOCKHOLM, SWEDEN.

AURICULAR APPARATUS.

Application filed February 28, 1920. Serial No. 362,174.

*To all whom it may concern:*

Be it known that I, GUSTAF LEONARD JONASON, a subject of the King of Sweden, residing at Stockholm, Sweden, have invented new and useful Improvements in Auricular Apparatus, of which the following is a specification.

The present invention relates to an apparatus for the transmission of articulate sounds, in which the electric current in the magnet-windings of electro-magnets is varied by the articulate sounds, which are to be transmitted, and the electro-magnets act upon and cause oscillations of members. The characteristic features of the invention consist in that the said members, in addition to the fact that they have free-edge parts, are provided with elastic supports in order to avoid self-tone, nodes, secondary tones and disadvantageous sympathy. Further the elastic supports can be wedge-shaped in order to give a wedge-shaped and controlable space between the poles and armatures and thus to facilitate the maximum oscillation amplitude of the members. Finally the members can support the electro-magnets and yokes inclosing them in such a way that, when the apparatus is placed upon a part of the human body for transmitting the oscillations of the members through the osseous structure to the auditory nerves, the yokes prevent contact between magnet-poles and armatures, should the pressure of the apparatus upon said part of the human body exceed a certain value. It should be noted that the magnet-poles and the armatures never may be brought in contact with each other during the working of the apparatus and thus the yokes are of great importance when it is desired to allow the members to act directly upon a part of the human body or upon a covering of the same, which does not prevent the transmissin of the oscillations to the osseous structure, because, should the yokes be left out, such contact would occur at a great pressure of the apparatus upon the said part of the human body or upon the said covering. It has for a long time been a desideratum to construct a practically useful acoustic apparatus for the transmission of articulate sounds through the air as well as for the transmission of such sounds through the osseous structure. The former apparatus up to date have been considerably improved as to the increasing of the sound, but nevertheless they are unpracticable owing to enervating sonorous color, self-tones and secondary tones of many kinds. The latter apparatus are not even known in medical literature as practicable for experiments. It is a scientific fact that the effect of the transmission through the osseous structure is 2.5 times greater than the effect of the transmission through the air. The apparatus according to the present invention produces sound waves, which make the apparatus more effective than other apparatus before proposed for the transmission of articulate sounds.

In the accompanying drawing the invention is illustrated merely in outline in two forms. Fig. 1 shows one form, Fig. 2 a detail of the latter on a larger scale, Fig. 3 another form, and Fig. 4 an electric circuit in outline.

In the form shown in Fig. 1, 1 is an apparatus box, which in a first compartment 2 has a microphone 3 for receiving sounds of speech, with a resistance 4 and transformer 5, in a second compartment 6 a battery 7, and in a third compartment 8 a system of articulating tongues 9, or the like, with electro-magnets 10, $10^1$, $10^2$ the microphone and the electro-magnetic device being coupled in such a way that the electro-magnets are acted on by the microphone current, which have on the tongues 9 armatures 11, $11^1$, $11^2$, arranged in the form of metal coverings. The shape, dimensions and material of the tongues may be selected according to circumstances. A suitable material is wood, for example poplar. The tongues or members 9 have free edge-parts, i. e., they do not form membranes as in certain earlier proposed apparatus, in which the circular edges of the membranes are fixed all around. Oscillating members with free edge parts have, it is true, been earlier proposed, but in distinction from these known members the member 9 in addition to this have elastic supports. So for instance the part or wooden rod 13 passes through a packing 12 in the wall of the box, said packing forming an elastic support. In addition to this the wooden rod 13 passes through a packing 14 forming also an elastic support for the same and having a free end 15, preferably tapering in wedge-fashion.

Another wooden rod 18, parallel to the wooden rod 13, and of similar shape to the latter, is firmly united by a cross piece 17 to the wooden rod 13, at 16, closer to the packing 14 than to the packing 12. The wooden rod 18 is by means of pivot $18^a$ rotatably journalled between the branches of a yoke 20, adjustably fixed on a sound box 19 for modifying the self-tone. When one speaks in the microphone, the electro-magnets 10, $10^1$, $10^2$ are affected in such wise that they exercise a more or less powerful attraction on their armatures 11, $11^1$, $11^2$, and thereby set the system of tongues 9 in articulating oscillations. In order to render the latter as effective as possible, the air is pumped through an opening 21, provided with a valve, out of the compartment 8, which for this purpose must be air-tight. With a view to improved efficiency, the electro-magnets 10, $10^1$, $10^2$ should have their poles somewhat obliquely inclined to the normal longitudinal direction of the wooden rods 13, 18. This oblique position is determined by the maximum amplitude of the wooden rods, as is illustrated on a larger scale in Fig. 2. For this purpose the electro-magnets should be adjustable in one way or another (not shown). The electro-magnet $10^2$ is shown provided with an elastic impingement cushion 22, which by the adjustment of the electro-magnet can be carried closer to or drawn further away from the wooden rod 13. At its end outside the apparatus box, the wooden rod 13 is connected with a flexible, elongated member 23 (for instance, a wire), which in turn is connected with a pincenez 24. If the latter is placed on the nose, the articulating oscillations of the tongue are transmitted through the member 23 and the pincenez 24 and the nose to the osseous structure, and give clear perceptions of articulating sounds. The member 23 need not be connected with the outer end of the wooden rod 13, but may be connected with it at other places. Thus, for example, one may confine oneself to one wooden rod only, and connect the said members 23 with its inner, free, swinging end. Instead of terminating in a pincenez, the member 23 may terminate in an opera glass or the like or in a piece in which the teeth are set, in which case the articulating oscillations of the tongues are transmitted through the teeth.

According to the form shown in Fig. 3, the tongues form an annular ribbon 31, arranged so as to be placed around the forehead, or head. A number of electro-magnets $10^3$ are carried by this ribbon. In accordance with the form shown, the electro-magnets are retained on the ribbon by means of yokes 32 fitted to the latter, and by elastic wedges 33 driven in between the electro-magnet and the ribbon. The lower edge of the ribbon is provided, opposite to the electromagnet poles, with the armatures $11^3$ for the latter in the form of a metal covering, and this lower edge, which should preferably taper downwards and which constitutes the actual articulating tongues, may be provided with downward projecting flaps (not shown). The electro-magnets $10^3$ are acted upon by a microphone circuit in the same manner as stated in connection with Fig. 1, and are connected in parallel with one another in the manner indicated in Fig. 4, in which five electro-magnets $10^3$ are shown. When one speaks on the microphone, the articulating sounds are transmitted by the oscillations of the tongues, or of the ribbon, direct from the ribbon to the head and its osseous structure. The elastic wedges 33 form the above mentioned wedge-shaped supports. The yokes 32 form the above named yokes which prevent contact between magnet-poles and armatures should the pressure of the apparatus upon the part in question of the human body exceed a certain value. For, if a great pressure be exerted upon the ribbon 31 or upon the yoke 32 the ends of the branches of said yokes 32 will yield outward and extend the part of the ribbon between said branches, so that the armature will be held from the electromagnet $10^3$. The apparatus shown in Fig. 3 is combined with a telephone apparatus in order simultaneously with the transmission of the articulating sounds through the osseous structure to obtain a transmission of the latter in the usual manner through the auditory canal. As is indicated by Fig. 3 the receivers 34 for this telephone are suspended or fastened on the ribbon. These fastenings are of such a nature that they allow of the receivers 34 being approached to or moved away from the ears. An apparatus arranged in accordance with the same principle as the ribbon may also be constructed so as to be placed for example on the nape under the clothes to be applied to an opera glass etc.

The apparatus can be used by doctors for the examination of patients, for educational purposes at schools for the deaf and dumb, for the daily use of patients, etc. The separate parts of the apparatus shown may of course be varied in material, size, shape, number, composition, and disposition, and be transposed, provided only that the characteristic features of the invention are retained.

What I claim is:

1. Apparatus for transmitting sound, comprising electromagnets, members adapted to be oscillated by said electromagnets, said members having free edge portions, elastic supports for said members, and means controlled by articulate sounds for varying the current in the magnet windings of the electromagnets.

2. Apparatus according to claim 1, the elastic supports being wedge-shaped thereby to provide a wedge-shaped, controllable space between the poles and armatures of the electromagnets.

3. Apparatus according to claim 1, yokes enclosing said electromagnets, said oscillatable members supporting said electromagnets and yokes, whereby the apparatus may be placed on a portion of the human body without causing contact between the magnet poles and armatures.

In testimony whereof I have signed my name to this specification.

GUSTAF LEONARD JONASON.